US009699271B2

(12) United States Patent
Brander et al.

(10) Patent No.: US 9,699,271 B2
(45) Date of Patent: Jul. 4, 2017

(54) METHOD AND APPARATUS FOR SUSPENDING SCREEN SHARING DURING CONFIDENTIAL DATA ENTRY

(71) Applicant: BlackBerry Limited, Waterloo (CA)

(72) Inventors: Ryan Conrad Brander, Beaverbank (CA); Yuri Poeluev, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 394 days.

(21) Appl. No.: 13/752,970

(22) Filed: Jan. 29, 2013

(65) Prior Publication Data

US 2014/0215356 A1  Jul. 31, 2014

(51) Int. Cl.

| G06F 21/62 | (2013.01) |
|---|---|
| H04L 29/08 | (2006.01) |
| G06F 3/14 | (2006.01) |
| G09G 5/14 | (2006.01) |
| G06F 21/83 | (2013.01) |
| G06F 21/84 | (2013.01) |

(Continued)

(52) U.S. Cl.
CPC ............... *H04L 67/36* (2013.01); *G06F 3/14* (2013.01); *G06F 21/6245* (2013.01); *G06F 21/83* (2013.01); *G06F 21/84* (2013.01); *G09G 5/14* (2013.01); *G09G 2354/00* (2013.01); *G09G 2370/10* (2013.01); *H04L 29/06401* (2013.01); *H04L 65/4015* (2013.01); *H04N 7/15* (2013.01)

(58) Field of Classification Search
CPC .. G06F 3/0481; G06F 3/04842; G06F 3/1454; G06F 9/4445; G06F 9/547; G06F 17/30873; G06F 21/62; G06F 21/6209; H04L 51/046; H04L 12/1813; H04L 12/1827; H04L 51/04; H04L 67/02; H04L 67/1095; H04L 67/36; H04L 67/38; H04L 12/66; H04L 12/581; H04N 7/15; H04M 3/56; G06Q 10/10; G06Q 10/107
USPC ....... 715/738, 740, 744, 751, 752, 753, 758, 715/759, 760, 778, 790, 971; 709/201, 709/203, 204, 205, 206, 207, 213, 217, 709/223, 231, 278; 340/506, 286.02; 348/4.07, 14.08; 365/63; 370/260, 261
See application file for complete search history.

(56) References Cited

U.S. PATENT DOCUMENTS

| 6,816,192 B1 * | 11/2004 | Nishikawa ............... 348/231.99 |
| 7,046,134 B2 | 5/2006 | Hansen |
| 8,028,020 B2 | 9/2011 | Huck et al. |

(Continued)

OTHER PUBLICATIONS

European Search Report, issued by the European Patent Office in corresponding European Application No. 13 15 3149.3, dated Aug. 28, 2013, 5 pp.

*Primary Examiner* — Rinna Yi
(74) *Attorney, Agent, or Firm* — Fish & Richardson P.C.

(57) ABSTRACT

A method, transmitting device, and computer-readable storage medium are provided for sharing image data between a source device and at least one receiving device. In one implementation, a method is provided for periodically sending image data of a shared screen to the at least one receiving device using a sharing connection. The method also receives a request associated with activating a user interface component involving confidential information, suspends updating of the image data responsive to the received request, and periodically sends suspended image data to the at least one receiving device while updating is suspended.

22 Claims, 12 Drawing Sheets

(51) Int. Cl.
  *H04N 7/15* (2006.01)
  *H04L 29/06* (2006.01)

(56) References Cited

U.S. PATENT DOCUMENTS

| | | |
|---|---|---|
| 8,230,351 B2 | 7/2012 | Patton et al. |
| 8,301,699 B1 | 10/2012 | Knight et al. |
| 2004/0213543 A1* | 10/2004 | Onomatsu ............... 386/46 |
| 2004/0218036 A1 | 11/2004 | Boss et al. |
| 2005/0081158 A1* | 4/2005 | Hwang ............... 715/740 |
| 2005/0132299 A1 | 6/2005 | Jones et al. |
| 2006/0002315 A1 | 1/2006 | Theurer et al. |
| 2006/0031779 A1* | 2/2006 | Theurer et al. ........ 715/781 |
| 2006/0161623 A1 | 7/2006 | Montgomery et al. |
| 2006/0168533 A1 | 7/2006 | Yip et al. |
| 2006/0215059 A1* | 9/2006 | Chang ............ H04N 5/4448 348/559 |
| 2009/0292999 A1* | 11/2009 | LaBine et al. ........ 715/740 |
| 2010/0131868 A1 | 5/2010 | Chawla et al. |
| 2010/0141746 A1* | 6/2010 | Ikeda ............ A61B 1/00009 348/68 |
| 2010/0188478 A1 | 7/2010 | Robinson et al. |
| 2011/0047485 A1* | 2/2011 | Takakura ............ 715/753 |
| 2011/0072355 A1 | 3/2011 | Carter et al. |
| 2011/0099496 A1* | 4/2011 | Baek et al. ............ 715/769 |
| 2011/0115875 A1 | 5/2011 | Sadwick et al. |
| 2011/0154204 A1 | 6/2011 | Narayanaswamy |
| 2011/0202850 A1* | 8/2011 | Chan et al. ............ 715/745 |
| 2011/0206285 A1 | 8/2011 | Hodge et al. |
| 2012/0036452 A1 | 2/2012 | Coleman et al. |
| 2012/0150956 A1 | 6/2012 | Tucker et al. |
| 2012/0327176 A1 | 12/2012 | Kee |
| 2013/0007895 A1* | 1/2013 | Brolley et al. ............ 726/28 |

* cited by examiner

METHOD AND APPARATUS FOR SUSPENDING SCREEN SHARING DURING CONFIDENTIAL DATA ENTRY

FIELD

Example embodiments relate to screen sharing systems, and more particularly to methods for transmitting shared image data from a transmitting device to a receiving device.

BACKGROUND

An increasing number of electronic devices today come equipped with cameras, displays, audio, and communication capabilities, and are therefore capable of participating in a video conference call. During such video conference calls, voice or data connections are typically made between two or more communication devices such as telephones or mobile communication devices, whereby image data captured from cameras associated with the communication devices is transmitted between the devices. In certain instances, a video conference call can be used for a collaborative computing session, such as an interactive conference where an organizer of the conference conducts visual demonstrations for other participants in the conference.

For example, an organizer of the video conference call can request to initiate a screen sharing session with a receiving device. During the screen sharing session, image data depicting the screen of the organizer's device is transmitted to a receiving device connected via the video conference call. Based on the transmitted image data, the receiving device can see the same user interface or a portion of the same user interface displayed on the organizer's device. Moreover, when the organizer performs actions on the user interface, the receiving device can view the performed actions based on updated image data.

BRIEF DESCRIPTION OF THE DRAWINGS

Reference will now be made to the accompanying drawings showing example embodiments of this disclosure. In the drawings.

DESCRIPTION OF EXAMPLE EMBODIMENTS

Figure 1:
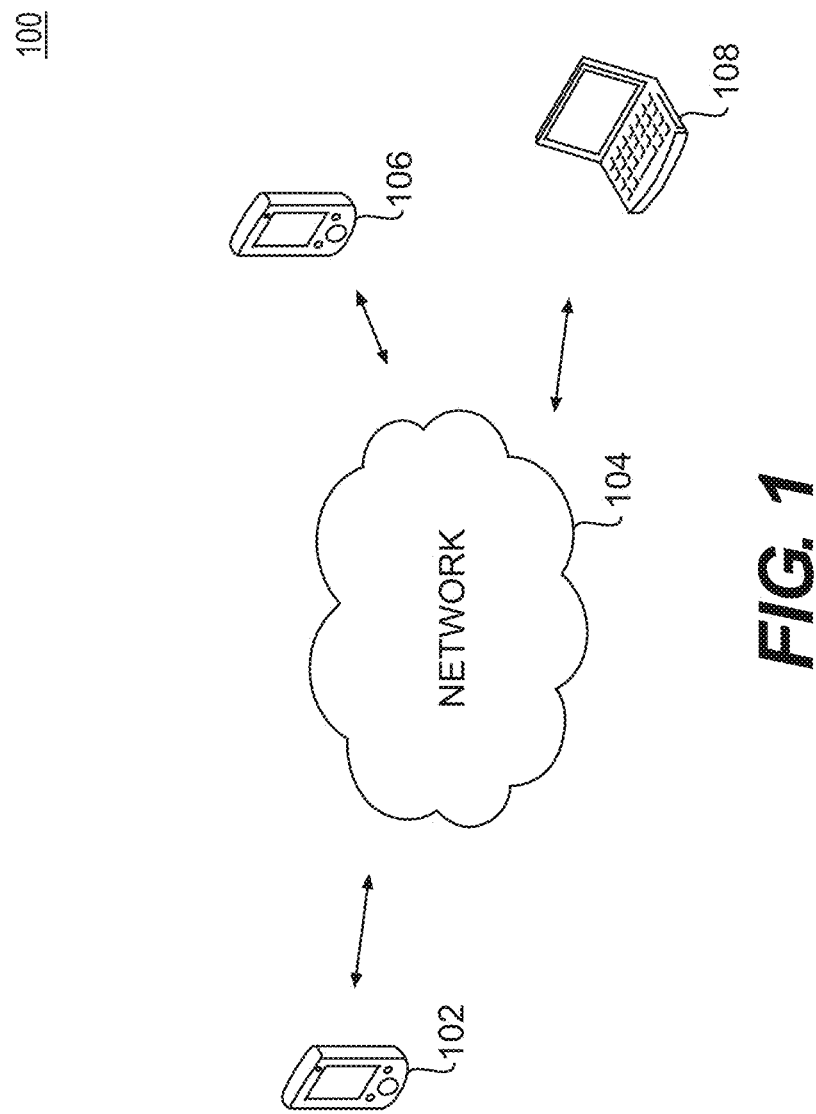
FIG. 1 shows, in block diagram form, an example system utilizing a video conference system.

Existing screen sharing technologies can inadvertently allow confidential or private information to be shared with devices during screen sharing. This exposure of confidential or private information can be harmful to the sender of the screen data on a personal basis, to the device, or to a company associated with the device. This can lead to fraudulent uses of the confidential or private information and can compromise security of the system. As used herein, "confidential information" generally refers to any type of information that a user would have an interest in keeping protected, and can include, but is not limited to, authentication information, such as passwords or other such login credentials, account numbers, social security numbers (SSN), social insurance numbers (SIN), credit card numbers or other credit card information, credit scores, financial information, such as bank account balances, or other such information.

In one example embodiment, a method for sharing image data between a source device and at least one receiving device. The method includes periodically sending image data of a shared screen to the at least one receiving device using a sharing connection. The method further includes receiving a request associated with activating a user interface component involving confidential information. The method also includes suspending updating of the image data responsive to the received request, and periodically transmitting suspended image data to the at least one receiving device while updating is suspended.

In another example embodiment, a source device for sharing image data with at least one receiving device is provided. The sharing device includes one or more computer-readable storage media configured to store instructions. The transmitting device further includes one or more processors configured to execute the instructions causing the sharing device to periodically send image data of a shared screen to the at least one receiving device using a sharing connection, receive a request associated with activating a user interface component involving confidential information, suspend updating of the image data responsive to the received request, and periodically send suspended image data to the at least one receiving device while updating is suspended.

In yet another example embodiment, one or more tangibly embodied nontransitory computer-readable storage media are provided. The computer-readable storage media store instructions that, when executed by a process, cause the source device to periodically send image data of a shared screen to at least one receiving device using a sharing connection, receive a request associated with activating a user interface component involving confidential information, suspend updating of the image data responsive to the received request, and periodically transmit suspended image data to the at least one receiving device while updating is suspended.

The following detailed description refers to the accompanying drawings. Wherever possible, the same reference numbers are used in the drawings and the following description to refer to the same or similar parts. While several example embodiments are described herein, modifications, adaptations, and other implementations are possible. For example, substitutions, additions, or modifications can be made to the components illustrated in the drawings, and the example methods described herein can be modified by substituting, reordering, or adding steps to the disclosed methods. Accordingly, the foregoing general description and the following detailed description are example and explanatory only and are not limiting. Instead, the proper scope is defined by the appended claims.

In addition, numerous specific details are set forth in order to provide a thorough understanding of the example embodiments described herein. However, it will be understood by those of ordinary skill in the art that the example embodiments described herein can be practiced without these specific details. Furthermore, well-known methods, procedures and components have not been described in detail so as not to obscure the example embodiments described herein.

Reference is now made to FIG. 1, which shows, in block diagram form, an example system 100 for the control and management of conferencing communications, such as a video conference call. System 100 can include a first electronic mobile device 102. Mobile device 102 is, in some instances, referred to as an "organizer's device" or "source device" or "transmitting device." It is appreciated that another device (such as mobile device 106 or laptop 108) can be the "organizer's device" or "source device" or "transmitting device."

Mobile device 102 is coupled to network 104, which can be any type of network capable of transmitting data, such as the Internet or any other type of LAN, WAN, or cellular network (e.g., 3GPP, 3GPP2, 4G, LTE). In some instances, network 104 can be omitted and the devices can communicate using any wired or wireless direct communication technology, such as via a Bluetooth connection.

Network 104 is operatively coupled to one or more mobile devices or computers, such as mobile device 106 or a laptop computer 108, to allow communication and exchange of data with mobile device 102. In some embodiments, mobile device 106 or laptop computer 108 is referred to as a "receiving device" that receives data packets from mobile device 102 via network 104. It is appreciated that another device (such as a desktop computer, television or computer monitor, or projector) can also be the "receiving device."

Figure 2:
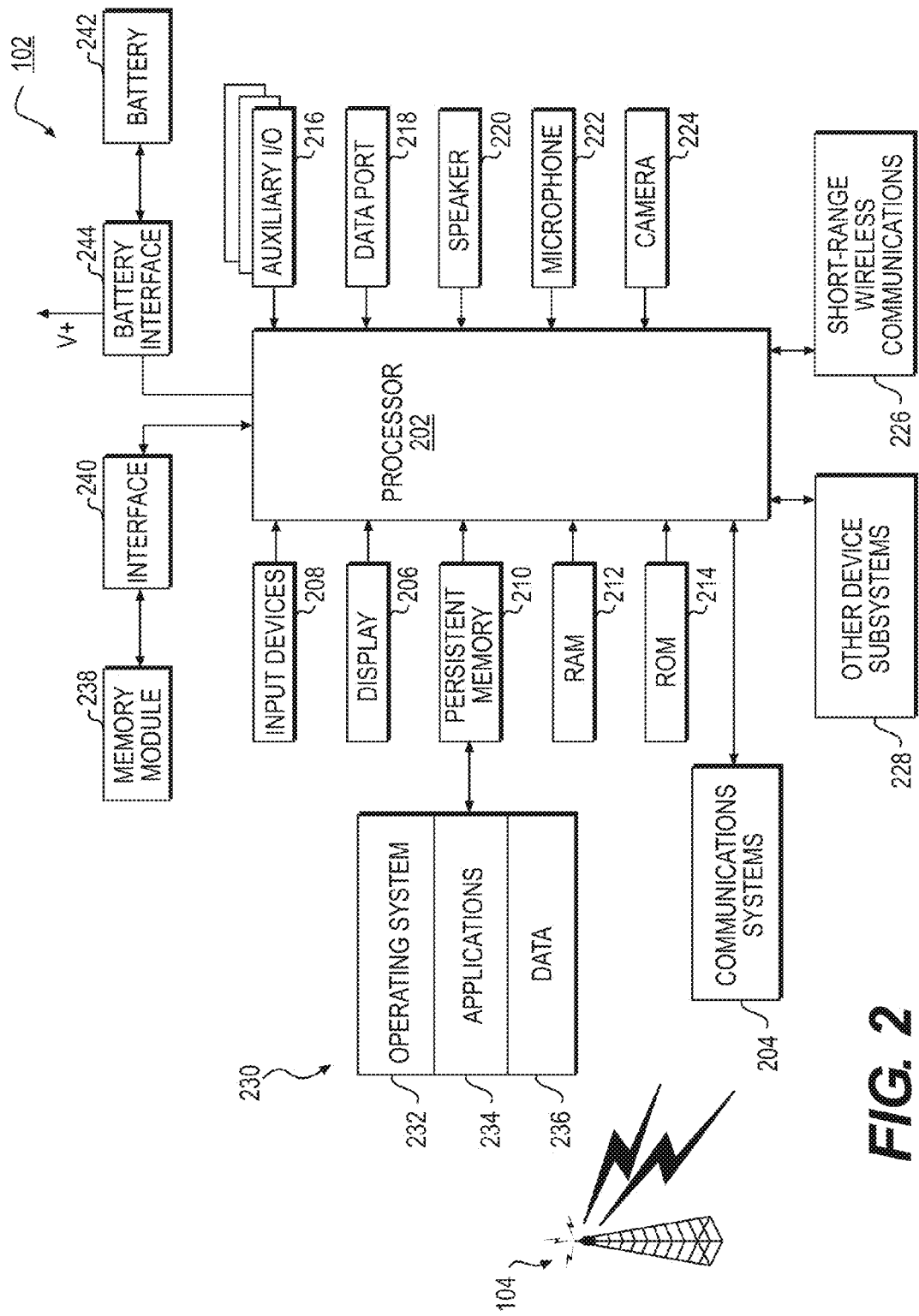
FIG. 2 is a simplified block diagram illustrating an example mobile communication device in accordance with an example embodiment.

Reference is now made to FIG. 2, which illustrates in detail example mobile device 102 in which example embodiments can be applied. Note that while FIG. 2 is described in reference to mobile device 102, it also applies to mobile device 106 and laptop 108. Accordingly, any reference to mobile device 102 is equally applicable to mobile device 106 and laptop 108, unless otherwise indicated.

Mobile device 102 may comprise a communication device having two-way or one-to-many data communication capabilities, video communication capabilities, and optionally voice communication capabilities, and the capability to communicate with other computer systems, for example, via the Internet. Depending on the functionality provided by mobile device 102, in various embodiments mobile device 102 can be a handheld device, a multiple-mode communication device configured for both data and voice communication, a smartphone, a mobile telephone, a netbook, a gaming console, a tablet, or a PDA (personal digital assistant) enabled for wireless communication.

Mobile device 102 includes a case (not shown) housing components of mobile device 102. The internal components of mobile device 102 can, for example, be constructed on a printed circuit board (PCB). The description of mobile device 102 herein mentions a number of specific components and subsystems. Although these components and subsystems can be realized as discrete elements, the functions of the components and subsystems can also be realized by integrating, combining, or packaging one or more elements in any suitable fashion.

Mobile device 102 includes a controller comprising at least one processor 202 (such as a microprocessor), which controls the overall operation of mobile device 102. Processor 202 can be a one or more microprocessors, field programmable gate arrays (FPGAs), digital signal processors (DSPs), or any combination thereof capable of executing particular sets of instructions. Processor 202 interacts with device subsystems such as a communication system 204 for exchanging radio frequency signals with a wireless network (for example, network 104) to perform communication functions.

Processor 202 also interacts with additional device subsystems including a communication system 204, a display 206 such as a liquid crystal display (LCD) screen or any other appropriate display, input devices 208 such as a keyboard and control buttons, a persistent memory 210, a random access memory (RAM) 212, a read only memory (ROM) 214, auxiliary input/output (I/O) subsystems 216, a data port 218 such as a conventional serial data port, a Universal Serial Bus (USB) data port, or a High-Definition Multimedia Interface (HDMI) data port, a speaker 220, a microphone 222, one or more cameras (such as camera 224), a short-range wireless communications subsystem 226 (which can employ any appropriate wireless (for example, RF), optical, or other short range communications technology (for example, Bluetooth or NFC)), and other device subsystems generally designated as 228. Some of the subsystems shown in FIG. 2 perform communication-related functions, whereas other subsystems can provide "resident" or on-device functions.

Communication system 204 includes one or more communication systems for communicating with network 104 to enable communication with external device, such as mobile device 106. The particular design of communication system 204 depends on the wireless network in which mobile device 102 is intended to operate. Mobile device 102 can send and receive communication signals over the wireless network after the required network registration or activation procedures have been completed.

Display 206 can be realized as a touch-screen display in some embodiments. The touch-screen display can be constructed using a touch-sensitive input surface, which is coupled to an electronic controller and which overlays the visible element of display 206. The touch-sensitive overlay and the electronic controller provide a touch-sensitive input device and processor 202 interacts with the touch-sensitive overlay via the electronic controller.

Camera 224 can be a CMOS camera, a CCD camera, or any other type of camera capable of capturing and outputting compressed or uncompressed image data such as still images or video image data. In some embodiments mobile device 102 can include more than one camera, allowing the user to switch, during a video conference call, from one camera to another, or to overlay image data captured by one camera on top of image data captured by another camera. Image data output from camera 224 can be stored in, for example, an image buffer, which can be a temporary buffer residing in RAM 212, or a permanent buffer residing in ROM 214 or persistent memory 210. The image buffer can be, for example, a first-in first-out (FIFO) buffer.

Short-range wireless communications subsystem 226 is an additional optional component that provides for communication between mobile device 102 and different systems or devices, which need not necessarily be similar devices. For example, short-range wireless communications subsystem 226 can include an infrared device and associated circuits and components, or a wireless bus protocol compliant communication device such as a Bluetooth® communication module to provide for communication with similarly-enabled systems and devices.

Processor 202 can be one or more processors that operate under stored program control and executes software modules 230 stored in a tangibly-embodied nontransitory computer-readable storage medium such as persistent memory 210, which can be a flexible disk, a hard disk, a CD-ROM (compact disk-read only memory), and MO (magneto-optical); a DVD-ROM (digital versatile disk-read only memory); a DVD RAM (digital versatile disk-random access memory); or a semiconductor memory. Software modules 228 can also be stored in a computer-readable storage medium such as ROM 214, or any appropriate persistent memory technology, including EEPROM, EAROM, FLASH. These computer-readable storage mediums store computer-readable instructions for execution by processor 202 to perform a variety of functions on mobile device 102.

Software modules 230 can include operating system software 232, used to control operation of mobile device 102. Additionally, software modules 230 can include software applications 234 for providing additional functionality to mobile device 102. For example, mobile device 102 can include a calendar application for allowing a user to schedule and establish appointments, such as video conference appointments, and a video conference application designed to assist a user with performing video conferences.

Software applications 234 can include a range of applications, including, for example, an e-mail messaging application, an address book, a notepad application, an Internet browser application, voice communication (i.e., telephony) application, a mapping application, a media player application, or any combination thereof. Each of software applications 234 can include layout information defining the placement of particular fields and graphic elements (for example, text fields, input fields, icons, etc.) in the user interface (i.e., display 206) according to that corresponding application.

Operating system software 232 can provide a number of application protocol interfaces (APIs) providing an interface for communicating between the various subsystems and services of mobile device 102, and software applications 234. For example, operating system software 232 provides a user interface API to any application that needs to create user interfaces for display on mobile device 102. Accessing the user interface API can provide the application with the functionality to create and manage screen windows and user interface controls, such as text boxes, buttons, and scrollbars; receive mouse and keyboard input; and other functionality intended for display on display 206. Furthermore, a camera service API can allow a video conference application to access camera 224 for purposes of capturing image data (such as a photo or video data that can be shared with a receiving device (e.g., receiving device 106)).

In some embodiments, persistent memory 210 stores data 236, including data specific to a user of mobile device 102, such as video conference profiles for indicating one or more preferences relevant for video conferencing. Persistent memory 210 can additionally store identification data, such as identifiers related to particular conferences, or an identifier corresponding to mobile device 102 to be used in identifying mobile device 102 during conferences. Persistent memory 210 can also store data relating to various people, for example, a name of a user, a user's identifier (user name, email address, phone number, or any other identifier), place of employment, work phone number, home address, or other types of user-specific information. Persistent memory 210 can further store data relating various applications with preferences of the particular user of, for example, mobile device 102. In certain embodiments, persistent memory 210 can store data 236 linking a user's data with a particular field of data in an application, such as for automatically entering a user's name into a username textbox on an application executing on mobile device 102. Furthermore, in various embodiments, data 234 also includes service data comprising information required by mobile device 122 to establish and maintain communication with network 104.

In some embodiments, auxiliary input/output (I/O) subsystems 216 comprise an external communication link or interface, for example, an Ethernet connection. In some embodiments, auxiliary I/O subsystems 216 can further comprise one or more input devices, including a pointing or navigational tool such as a clickable trackball or scroll wheel or thumbwheel; or one or more output devices, including a mechanical transducer such as a vibrator for providing vibratory notifications in response to various events on mobile device 102 (for example, receipt of an electronic message or incoming phone call), or for other purposes such as haptic feedback (touch feedback); or any combination thereof.

In some embodiments, mobile device 102 also includes one or more removable memory modules 238 (typically comprising FLASH memory) and a memory module interface 240. Among possible functions of removable memory module 238 is to store information used to identify or authenticate a user or the user's account to a wireless network (for example, network 104). For example, in conjunction with certain types of wireless networks, including GSM and successor networks, removable memory module 238 is referred to as a Subscriber Identity Module (SIM). Memory module 238 is inserted in or coupled to memory module interface 240 of mobile device 102 in order to operate in conjunction with the wireless network.

Mobile device 102 also includes a battery 242 which furnishes energy for operating mobile device 102. Battery 242 can be coupled to the electrical circuitry of mobile device 102 through a battery interface 244, which can manage such functions as charging battery 242 from an external power source (not shown) and the distribution of energy to various loads within or coupled to mobile device 102.

A set of applications that control basic device operations, including data and possibly voice communication applications can be installed on mobile device 102 during or after manufacture. Additional applications or upgrades to operating system software 232 or software applications 234 can also be loaded onto mobile device 102 through the wireless network (for example network 104), auxiliary I/O subsystem 216, data port 218, short-range wireless communication subsystem 226, or other suitable subsystem such as 228. The downloaded programs or code modules can be permanently installed, for example, written into the persistent memory 210, or written into and executed from RAM 212 for execution by processor 202 at runtime.

Mobile device 102 can provide three principal modes of communication: a data communication mode, a voice communication mode, and a video communication mode. In the data communication mode, a received data signal such as a text message, an e-mail message, Web page download, or an image file are processed by communication system 204 and input to processor 202 for further processing. For example, a downloaded Web page can be further processed by a browser application, or an e-mail message can be processed by an e-mail message messaging application and output to display 206. A user of mobile device 102 can also compose data items, such as e-mail messages, for example, using the input devices, such as auxiliary I/O subsystem 216, in conjunction with display 206. These composed items can be transmitted through communication system 204 over the wireless network (for example network 104). In the voice communication mode, mobile device 102 provides telephony functions and operates as a typical cellular phone. In the video communication mode, mobile device 102 provides video telephony functions and operates as a video teleconference terminal. In the video communication mode, mobile device 102 utilizes one or more cameras (such as camera 224) to capture video for the video teleconference.

As indicated above, persistent memory 210 can store software applications 234, each of which providing functionality for mobile device 102. For example, a video conference application provides a user of mobile device 102 with the ability to coordinate video conferences with others users, such as a user of mobile device 106. The video conference includes the transmission of video image data captured via camera 224, enabling users to view live pictures of one another. In another embodiment, the video conference application provides the capability of sending screen image data during a screen sharing session between the devices. That is, the video conference application can provide capabilities such that screen image data depicting the screen of mobile device 102 can be displayed on one or more of, for example, mobile device 106, laptop 108, or a plurality of additional computing devices in a single sharing session or a multicast sharing session. The video conference application can provide a user of mobile device 102 with the ability to switch between transmission of live video images, and transmission of image data of a shared screen.

As an example, an organizer of a video conference may desire to demonstrate the functionality of a certain software application to a user at a receiving device. As such, the organizer establishes a video conference (sharing connection), and using the screen sharing capability of the conferencing software, can periodically transmit screen image data depicting the shared screen of the organizer's device to a receiving device so that the images can be displayed on the receiving device. The screen image data can be streamed from the organizer's device to the receiving device in real time, such as by providing a direct stream of image data from the screen onto an image buffer, or by periodically capturing a screenshot and placing the screenshot onto the image buffer. The screen image data from the image buffer can then be transmitted to the receiving device by a streaming service that streams the screen image data placed onto the image buffer.

The screen image data loaded into the image buffer can be periodically updated based on the passage of a certain preset amount of time, or based on a detected change on the display, such as a moved cursor. The screen image data in the buffer is then periodically transmitted to the receiving device, so that the receiving device maintains an accurate copy of the screen on the organizer's device. In another embodiment, the screen image data can be recorded in advance and pre-stored in memory, such as persistent memory 210, for streaming to the receiving device at a delayed time, such as for recording a training video. At the later time, the designated receiving device can connect to the organizer's device, and based on the established video conference, the stored screen image data stream can begin streaming.

Figure 3:
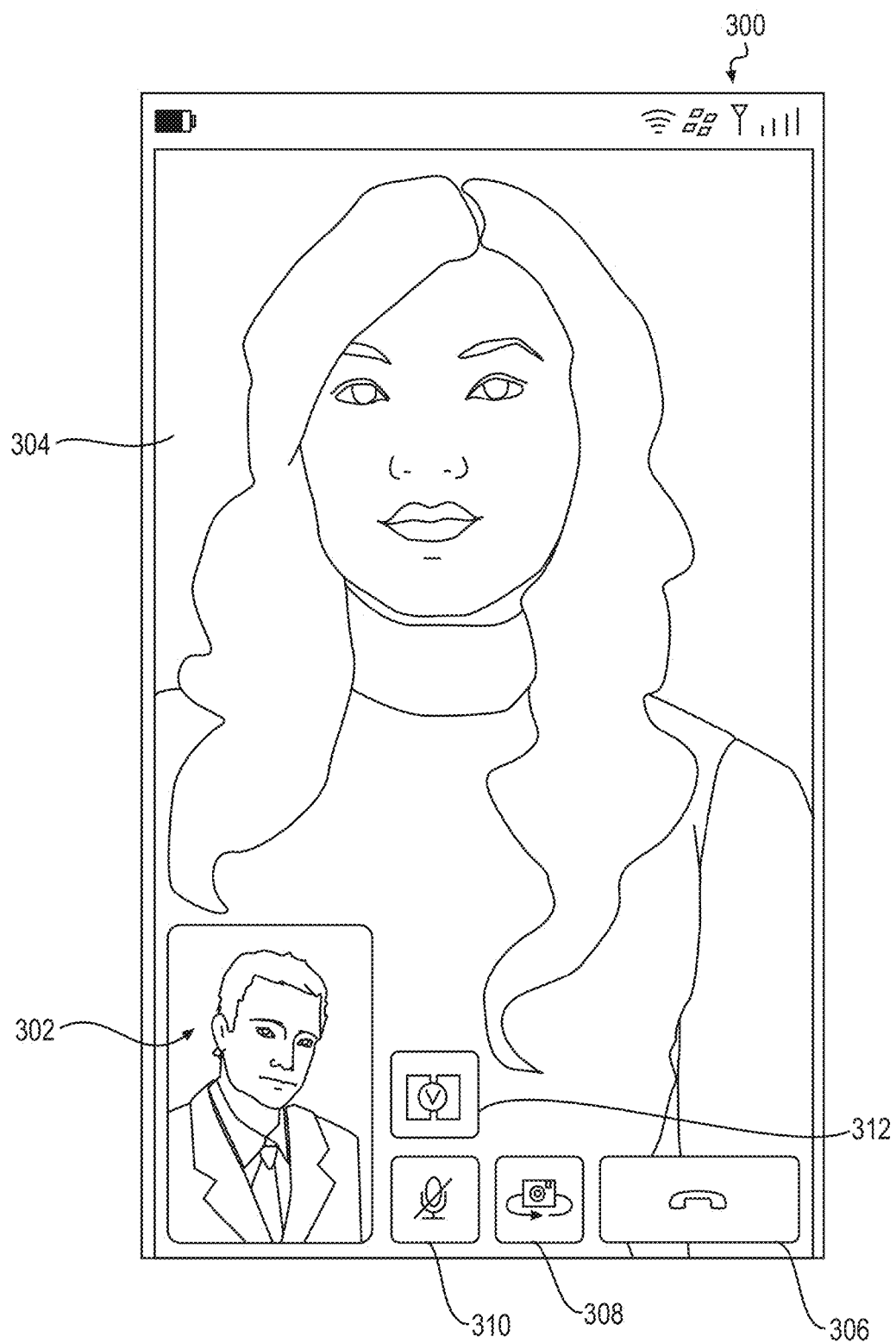
FIG. 3 illustrates an example graphical user interface displayed on a mobile communication device for conducting a video conference.

FIG. 3 shows an example video conference application user interface 300 for conducting a video conference. Interface 300 can be accessed from the desktop of a mobile device (for example, mobile device 102), for example in response to a command from auxiliary I/O subsystem 216 to execute the video conference application. In some embodiments, interface 300 can be accessed via physical key or button on the mobile device.

Interface 300 provides real time visual images of the participants in the video conference. More specifically, interface 300 can display a visual representation of organizer as a reduced image 302, and a visual representation of the user of the receiving device as a large image 304. This arrangement of visual representations allows the organizer to clearly see the user of the receiving device, as well as confirm the content of the video currently being streamed to the receiving device. Moreover, on the screen of the receiving device, the visual representations can be flipped, such that the visual representation of the user of the receiving device is shown as a reduced image, while the organizer's visual representation is shown as a large image.

Interface 300 can also provide a variety of controls to the organizer, such as an end call button 306 that ends the video conference, a change camera button 308, a mute button 310, and a screen sharing button 312. Selecting change camera button 308 will cause the operating system 232 to change from one camera on the mobile device to a different camera (e.g., from a camera on the front of the mobile device to a camera on the back of a mobile device), and selecting mute button 310 will cause microphone 222 to mute, so that the organizer's device will not transmit sounds. Selecting screen sharing button 312 will cause the video conference application to switch from providing real time video image data from a camera to providing screen image data during a screen sharing mode. The screen sharing mode provides the capability to transmit screen image data from the screen of the user who selected screen sharing button 312 to a receiving device.

Figure 4:
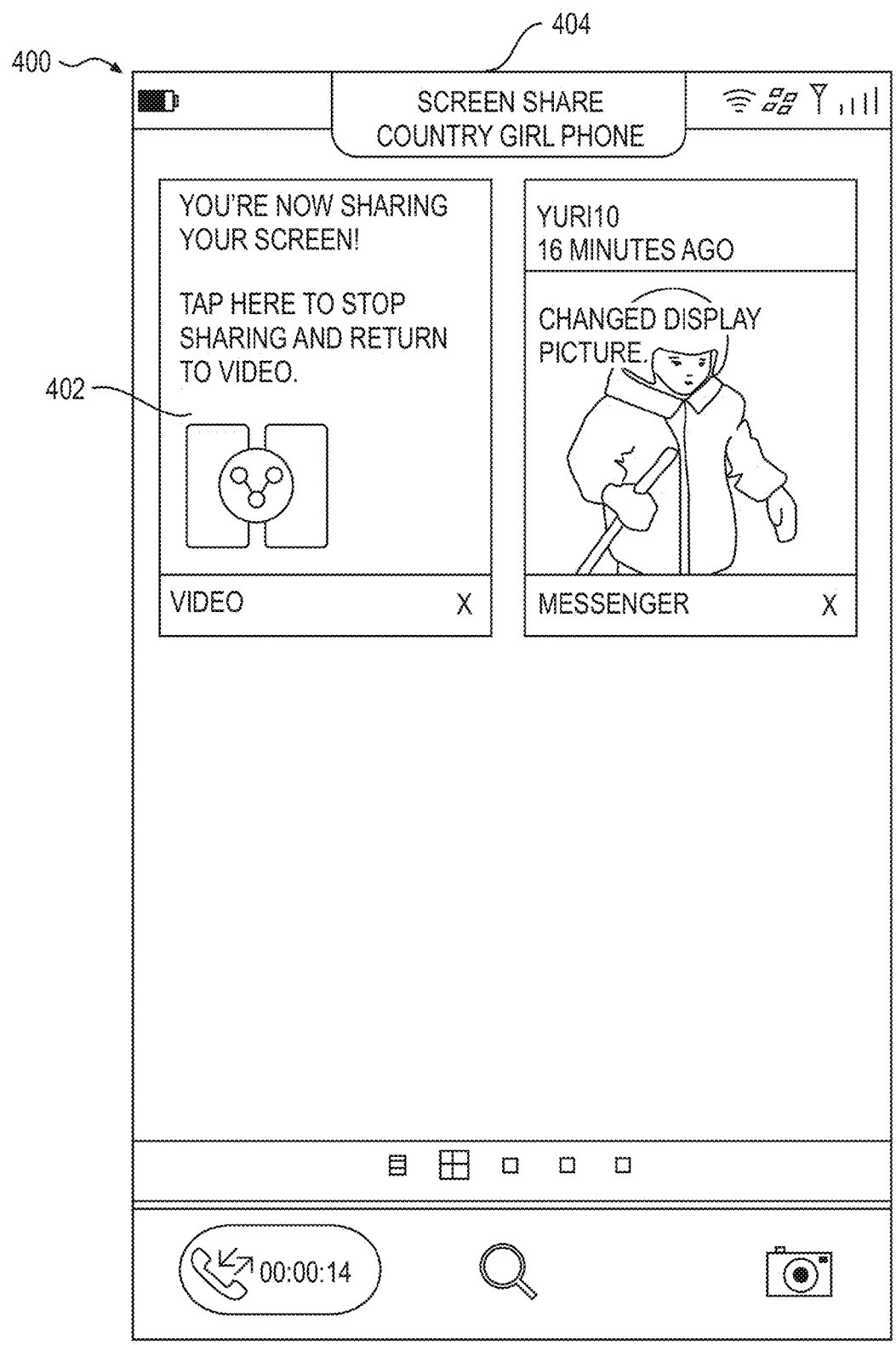
FIG. 4 illustrates an example graphical user interface displayed on a mobile communication device during a screen sharing mode, in accordance with an example embodiment.

FIG. 4 shows an example of a screen sharing user interface 400 displayed on, for example, an organizer's device after the organizer selects screen sharing button 312 during a video conference. Screen sharing user interface 400 displays an option 402 enabling the organizer of the screen sharing to stop the screen sharing mode by selecting option 402, which can cause interface 300 (as shown above in FIG. 3) to be redisplayed for the video conference. Screen sharing user interface 400 further displays a notification 404 providing a visual notification that the mobile device is in screen sharing mode. In some embodiments, notification 404 also provides identifying information of the organizer's device, such as an identifier or a name corresponding to the organizer's device, which can be retrieved from data 236.

As a result of selecting screen sharing button 312 on the organizer's device, the video conference application can request access to a stream of screen data, or a screenshot of the screen data, using an API provided by operating system 232. Based on the issued request by the video conference application, operating system 232 can place notification 404 onto the screen. After notification 404 is displayed, operating system 232 requests, from a camera service associated with the display screen, a screen image of the current display screen. The camera service then access a screen service, which can periodically place a stream of screen image data onto an image buffer. In some embodiments, a screenshot can be periodically generated and the screenshot can be placed onto the buffer based on the passage of a certain preset amount of time, or based on a detected change on the display, such as a cursor movement. Using the screen image data periodically placed onto the buffer, screen image data is sent from the organizer's device to the receiving device so that an accurate representation of the organizer's screen can be viewed on the receiving device.

Figure 5A:
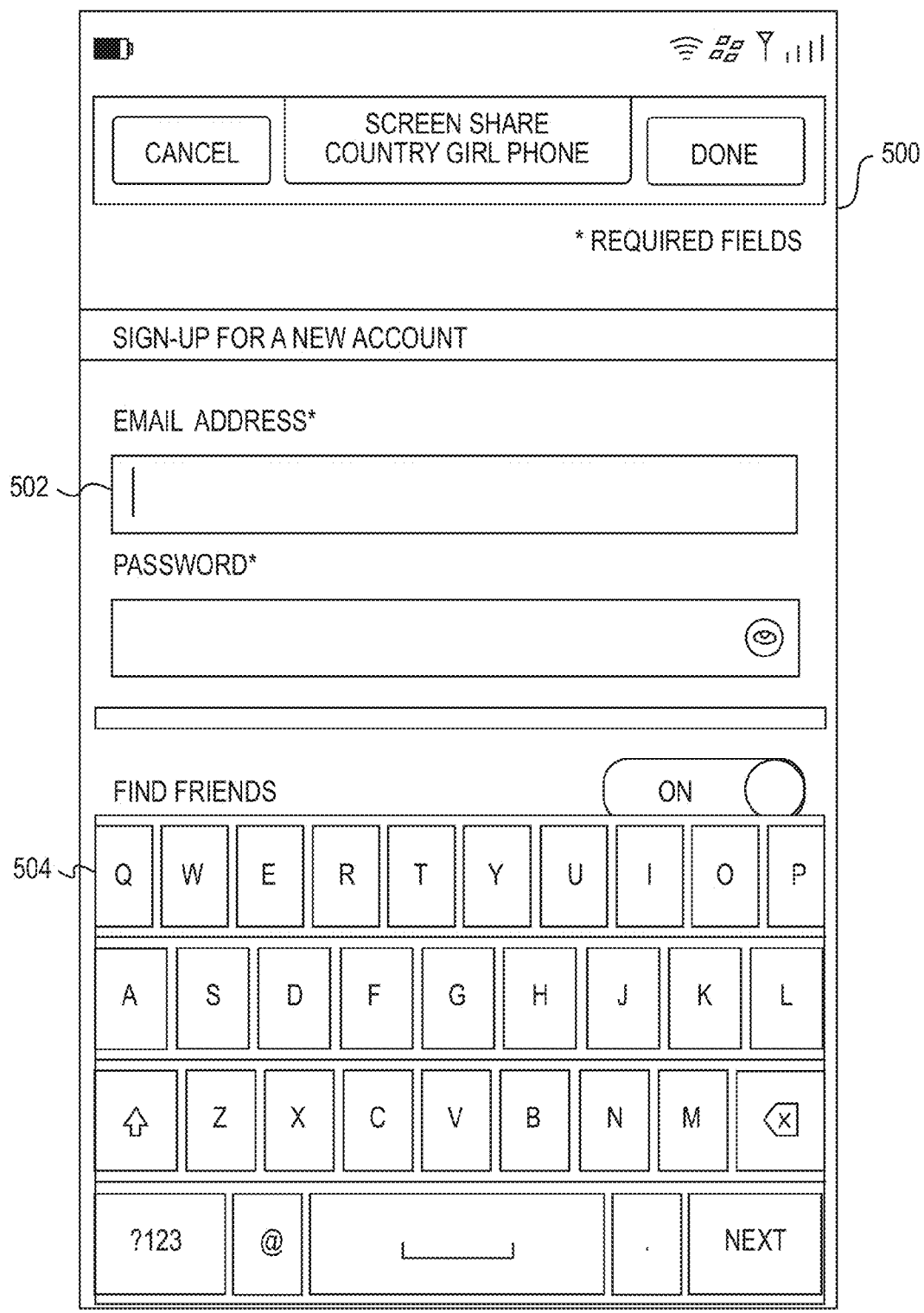
FIGS. 5A-5F illustrate example graphical user interfaces displayed on a mobile communication device during a screen sharing mode, in accordance with an example embodiment.

FIG. 5A shows an example of shared user interface 500 depicting an organizer's screen that is being shared with a receiving device. For example, the organizer would like to display functionality associated with an application running on the organizer's device. To do so, for example, the organizer executes on the organizer's device the application requiring authentication information to log into the application. In this particular example embodiment, the application requires authentication information which includes an email address and a password as part of an authentication process. In certain embodiments, the organizer can use a touchscreen of display 206 to select a user interface element, such as email address textbox 502, so that the organizer can enter an email address. The application detects a current input focus activating or selecting textbox 502, and requests activation or display of a virtual keyboard 504 from operating system 232 by issuing an appropriate API request for the user interface element corresponding to the virtual keyboard. In some embodiments, the virtual keyboard is a virtual keyboard for a specific mode. For example, the virtual keyboard for the specific mode may be conducive to password entry and may comprise letters and numbers and other special characters.

Based on the activation of textbox 502 and the received request for displaying virtual keyboard 504, operating system 232 performs a security check to ensure the safeguarding of confidential or private information. Specifically, because screen sharing may be occurring, there is a risk that confidential information associated with the organizer of the video conference could be transmitted to the receiving device. To avoid sharing confidential information, operating system 232 can perform a check to determine whether screen sharing is occurring, and if so, whether confidential information is going to be displayed on display 206, based at least in part on the activation of textbox 502.

In certain embodiments, operating system 232 determines whether a request has been received to display confidential information, or whether confidential information is about to be inputted and subsequently displayed, by determining whether a current input focus is associated with a user interface component used for receiving or displaying confidential information. In some embodiments, this user interface component can be an authentication field or an authentication prompt. Based on determining that the current input focus is associated with a user interface component that involves confidential information, operating system 232 issues a request associated with pausing screen sharing. After determining that an activated user interface component does not involve confidential information, operating system 232 allows screen sharing to proceed, and screen image data continues to be periodically transmitted to the receiving device during data entry in textbox 502, where the screen image data is updated to reflect changes on the screen of the organizer's device.

In some embodiments, operating system 232 determines that a user interface component involves confidential information by determining whether the user interface component is a component recognized as being used for receiving confidential information, such as a password field. Alternatively, operating system 232 can base the determination on a request received from the application in relation to the user interface component. For example, upon activating textbox 502, the application requests displaying of a virtual keyboard associated with textbox 502, via an API request to operating system 232. Operating system 232 then determines that textbox 502 is associated with a standard virtual keyboard used for general text entry (i.e., nonconfidential information), and because the standard virtual keyboard is not a virtual keyboard used specifically for entering confidential information, operating system 232 can determine that the user will not be entering confidential information.

Alternatively, in some embodiments, operating system 232 can determine that a user interface component involves confidential information by detecting the display or activation of a user interface form containing a number of fields for data entry. As operating system 232 may not have sufficient information to determine which of the fields included on the form involves confidential information, operating system 232 can recognize the display or activation of the user interface form as potentially involving confidential information. Operating system 232 can perform this determination based on any type of user interface element, such as based on the display or user interaction with a dialog box or pop-up, either displayed full screen or in a partial portion of the screen.

Figure 5B:
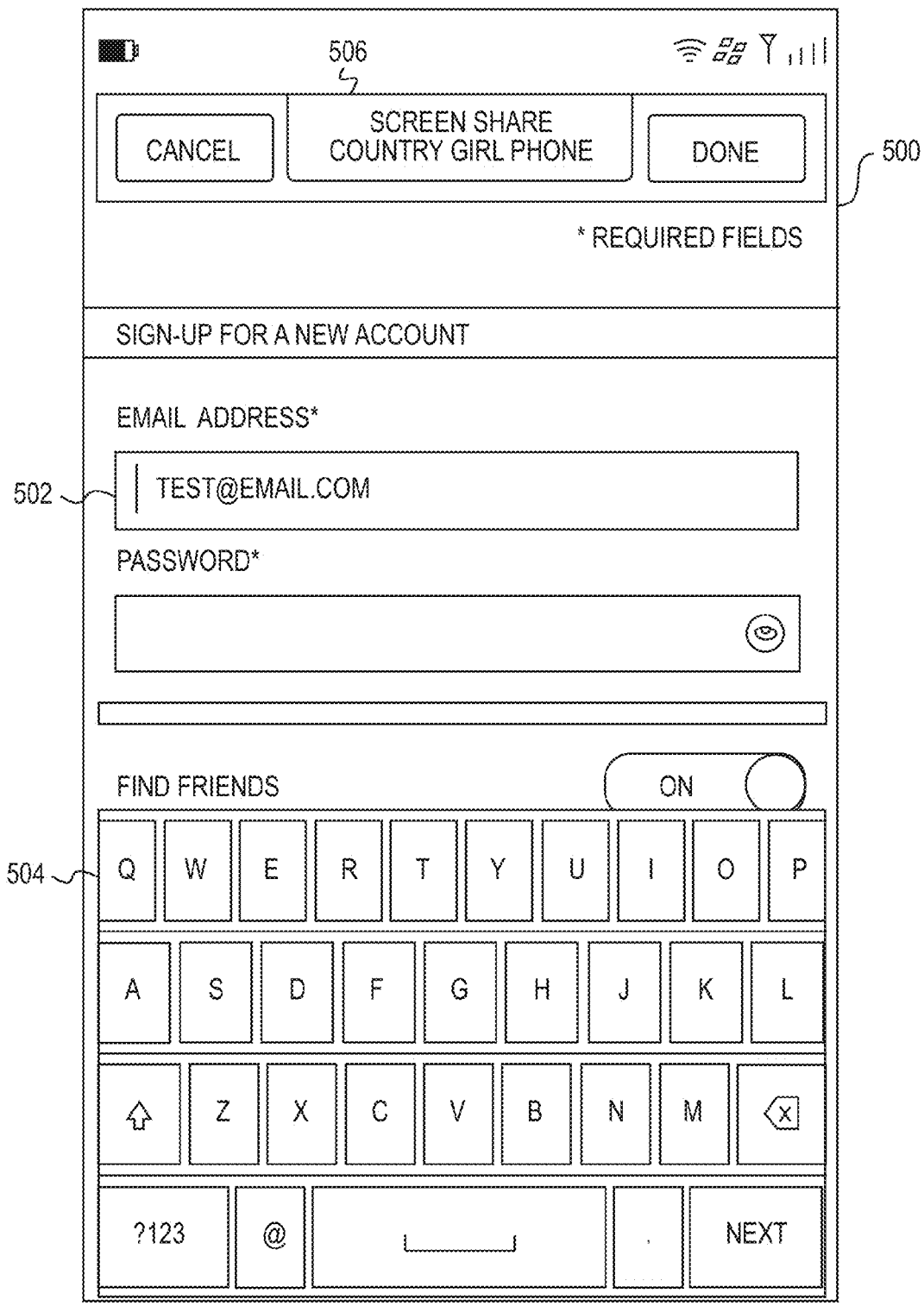

FIG. 5B shows an example of shared user interface 500, in accordance with an example embodiment, which can be displayed as a result of activation of textbox 502 and the subsequent entry of text representing an email address into textbox 502. As textbox 502 is known to operating system 232 as a standard textbox user interface component, operating system 232 determines that textbox 502 does not involve confidential information. As such, screen sharing continues, and the receiving device continues to receive updated screen image data based on the periodic transmission of the data from the organizer's device. Furthermore, notification 506 continues to indicate that screen sharing is occurring between the devices.

Figure 5C:
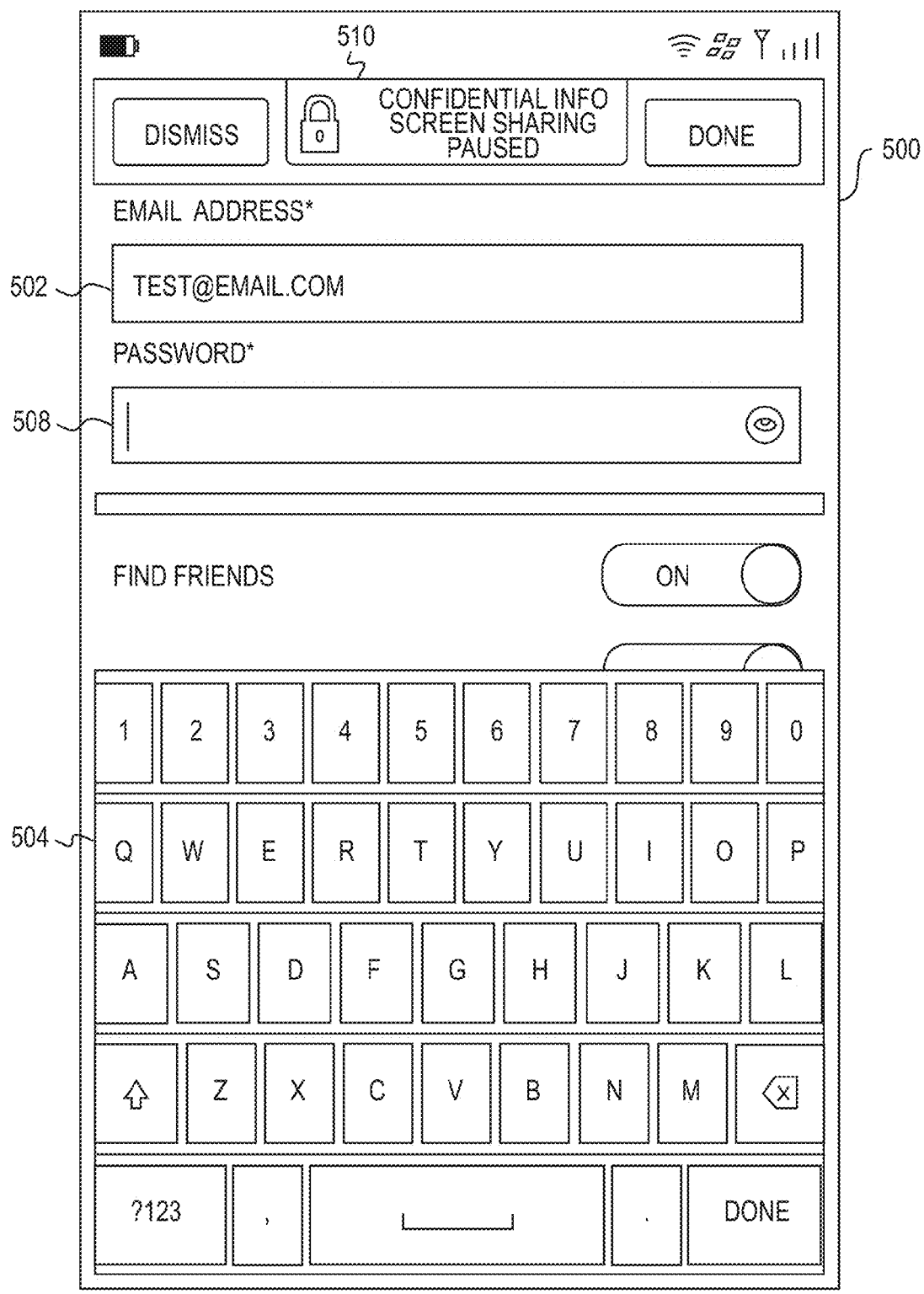

FIG. 5C shows an example of shared user interface 500, in accordance with an example embodiment, which can be displayed as a result of activation of password textbox 508 based on the current input focus being associated with the textbox. The application detects a current input focus activating or selecting password textbox 508. In some embodiments as shown in FIG. 5C, the activating or selecting password textbox 508 triggers an activation or display of a virtual keyboard associated with password textbox 508 from operating system 232 by issuing an appropriate API request. Before displaying the virtual keyboard, operating system 232 can perform a check to determine whether a request has been received to display confidential information, or whether confidential information is about to be inputted and subsequently displayed on display 206, similar to the operation performed with respect to textbox 502.

For example, in FIG. 5C, operating system 232 determines that screen sharing is occurring, and operating system 232 subsequently determines whether password textbox 508 is a user interface component involving confidential information. Operating system 232 can determine whether password textbox 508 involves confidential information by, for example, recognizing password textbox 508 as a predefined user interface component involving confidential information.

In some embodiments, operating system 232 can determine that the virtual keyboard associated with password textbox 508 is a password-specific virtual keyboard, containing additional keyboard elements to assist a user in entering passwords. For example, the password-specific virtual keyboard can include an additional row of numerical values, as passwords typically contain numbers in addition to letters. Thus, based on the specific type of virtual keyboard requested by the application, operating system 232 can determine that password textbox 508 is a user interface component involving confidential information.

Alternatively, in some embodiments, activation of the password textbox can occur when a user begins typing in password textbox 508. Specifically, operating system 232 can receive a request to display the password-specific virtual keyboard, but the determination that password textbox 508 is a user interface component involving confidential information can be triggered by a user beginning to type using the password-specific virtual keyboard.

Therefore, after determining that there is a risk that confidential information can be shared with a receiving device, operating system 232 undertakes a process to suspend the transmission of updated screen image data to the receiving device. First, operating system 232 can display an updated notification 510 to indicate that screen sharing is currently paused, and can display appropriate graphics to indicate that confidential information is being handled.

After updated notification 510 is displayed to indicate that screen sharing is paused, operating system 232 requests, from a camera service associated with the display screen, that screen sharing be paused. The camera service can then access a screen service to request that screen sharing be paused. The screen service can place, on an image buffer, a single screen image containing updated notification 510, representing the last screen capture prior to suspending updating. The screen service can then suspend placing screen image data onto the image buffer. In some embodiments, the screen service can continue to feed the single screen image data to the image buffer until the suspension has ended. After the screen service reports that screen sharing is paused, the camera service can retrieve the single screen image containing updated notification 506. During suspension of screen sharing, the single screen image containing updated notification 510 can be periodically placed onto the image buffer and transmitted to the receiving device while updating of the screen image data is suspended, so that the receiving device is informed (via a "frozen" single image containing updated notification 506) that screen sharing is paused based on confidential information. The periodic transmission of the single screen image assists in preventing user confusion by alerting the user of the receiving device that the suspension of screen image data is due to the entry of confidential information on the organizer's device, and not due to any network difficulties.

In some other embodiments, the screen service can access position information corresponding to password textbox 508, and can continue to generate screen image data while excluding, from the screen image data, any information at the location on the display defined by the position information. In this fashion, screen image data can be generated for the remainder of the display, but a portion of the screen image data can be suspended and will not include any updates to actions performed with respect to password textbox 508. The screen image data is periodically placed on the image buffer and transmitted to the receiving device, but the portion of the screen image data corresponding to the position of password textbox 508 would remain static, and the receiving device would not see any input corresponding to password textbox 508.

Figure 5D:
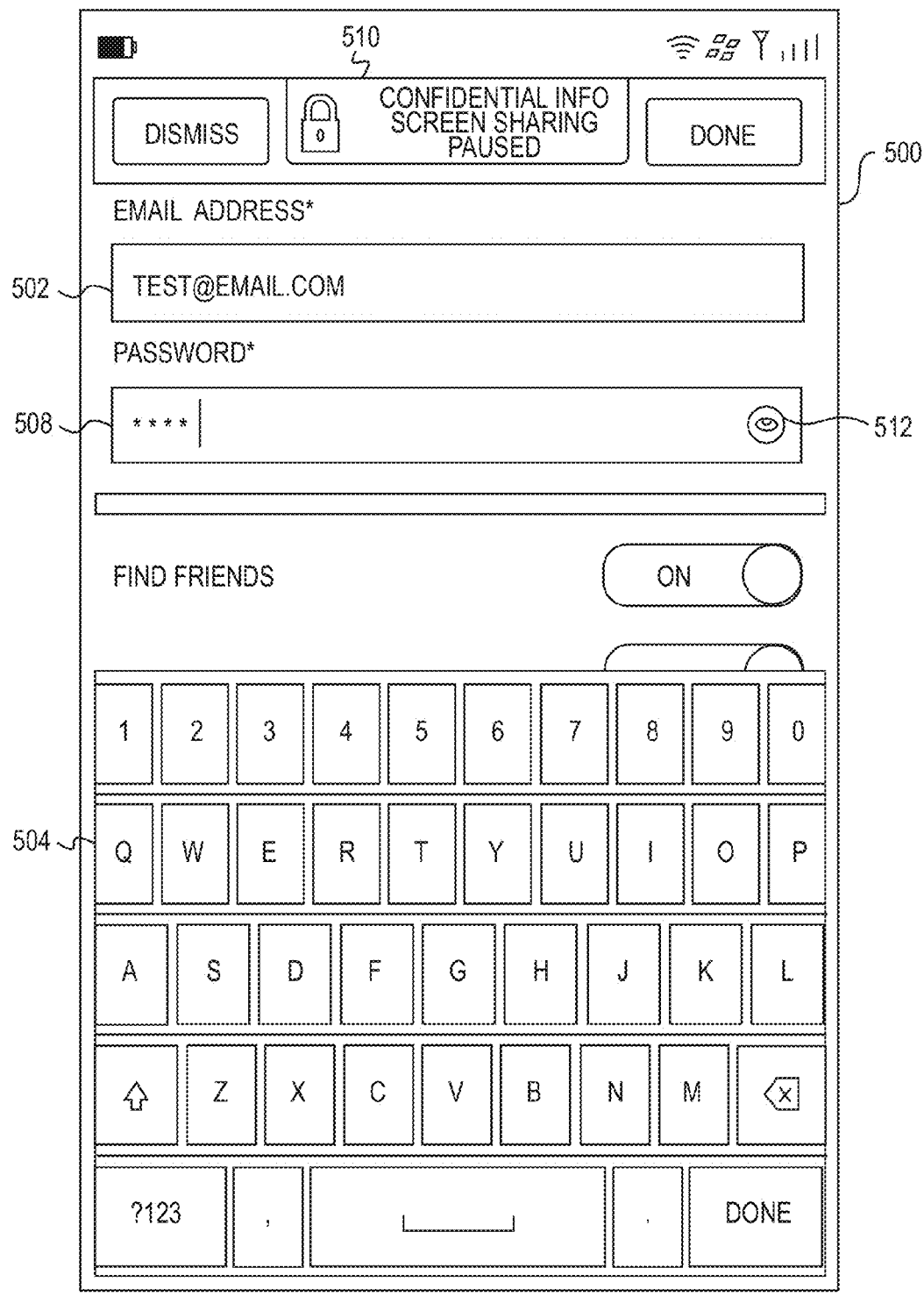

FIG. 5D shows an example of shared user interface 500, in accordance with an example embodiment, which can be displayed as a result of screen sharing being paused. Specifically, the organizer of the video conference is assured that confidential information can be entered into password textbox 508 without data being transmitted to the receiving device. Furthermore, as an additional layer of security, confidential information entered into password textbox 508 can be masked to prevent viewing from third parties within eyesight of the organizer's device.

Figure 5E:
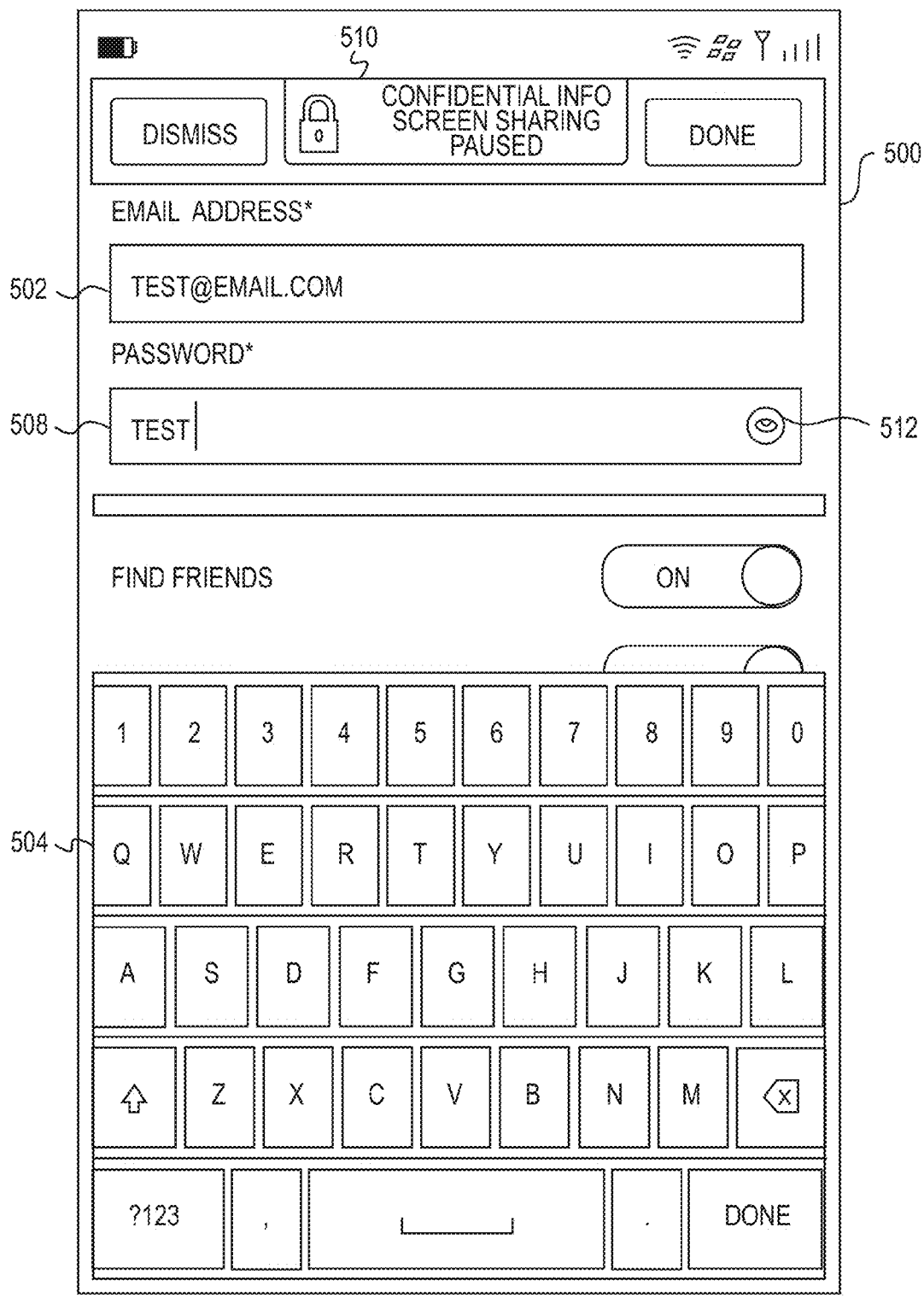

In an example embodiment, shared user interface 500 can include a toggle visibility button 512 that can be used to toggle on or off the masking of confidential information in a user interface component, such as password textbox 508. For example, as shown in FIG. 5E, the organizer of the video conference can select visibility button 512, causing the password entered into password textbox 508 to be unmasked. The unmasking of the password entered into password textbox 508 can occur without changing the status of the paused screen sharing, and therefore can provide added convenience to the organizer by allowing the organizer to see what password is being entered, without fear of the viewable password being transmitted to the receiving device.

In alternate embodiments, visibility button 512 can override the paused screen sharing mode, and can cause screen sharing to resume. For example, in collaboration between two users, it may be beneficial to display certain confidential data to the user of the receiving device, as such confidential information may be known to the user of the receiving device. As such, the organizer can select visibility button 512, which overrides the paused screen sharing set by operating system 232 for the particular user interface component only.

Figure 5F:
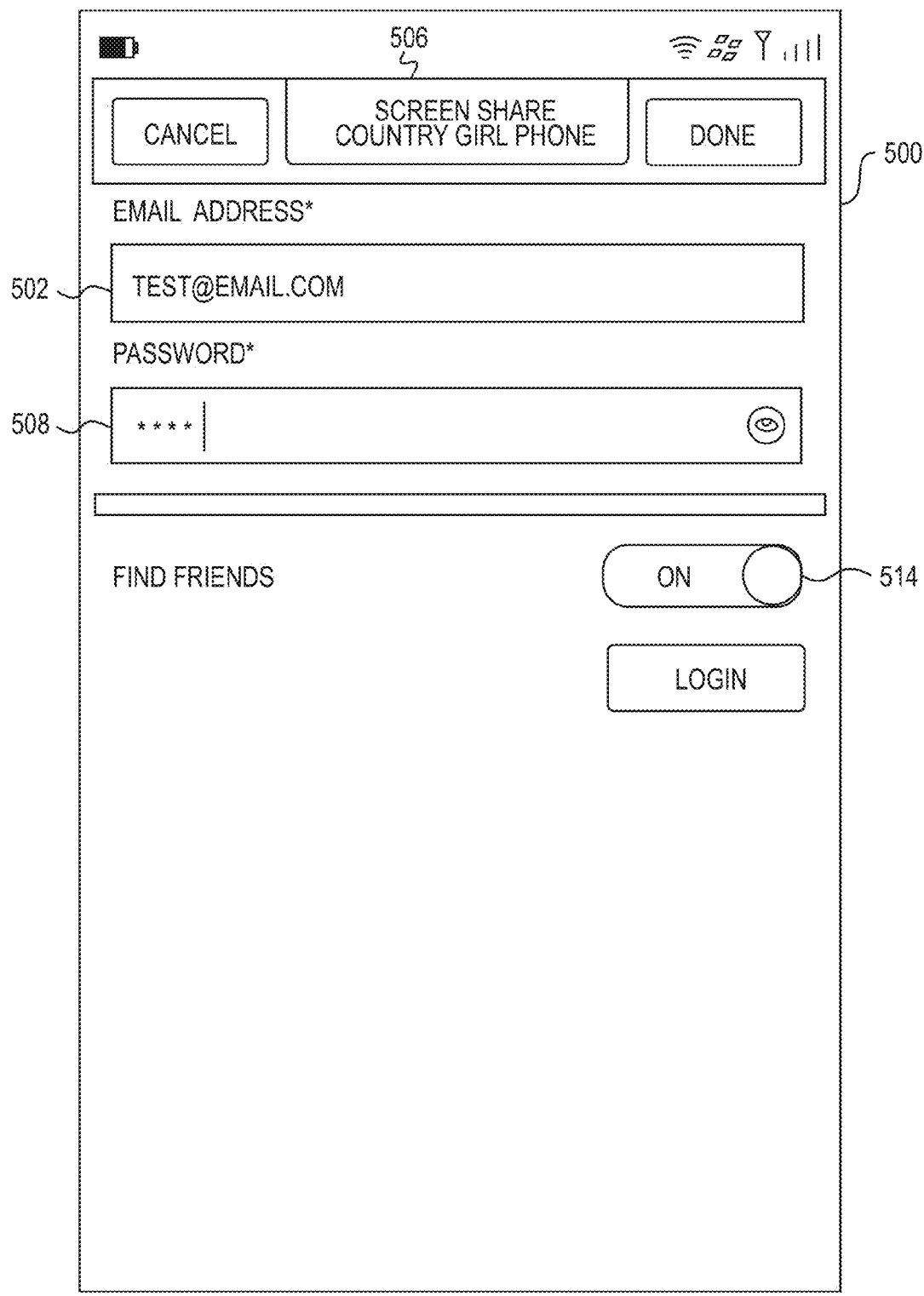

FIG. 5F shows an example of shared user interface 500, in accordance with an example embodiment, which can be displayed as a result of determining that the current input focus is no longer associated with a user interface component involving confidential information. For example, after the organizer has entered a password into password textbox 508, operating system 232 can determine that the current input focus is associated with toggle button 514, and therefore password textbox 508 is no longer activated. After detecting that password textbox 508 is no longer activated, operating system 232 requests that screen sharing resume by contacting the camera service. The camera service can contact the screen service to request that screen sharing be resumed. The screen service can then begin periodically placing screen image data onto the image buffer, replacing the single screen image that was being periodically transmitted to the receiving device while screen sharing was paused. The screen image data depicts the screen of the organizer's device after password textbox 508 has been deactivated. Accordingly, the receiving device would not see any screen image data depicting the entry of data into password textbox 508, but would only see screen image data with the password already entered. Also, operating system 232 redisplays notification 506 to indicate that screen sharing is currently in progress.

Figure 6:
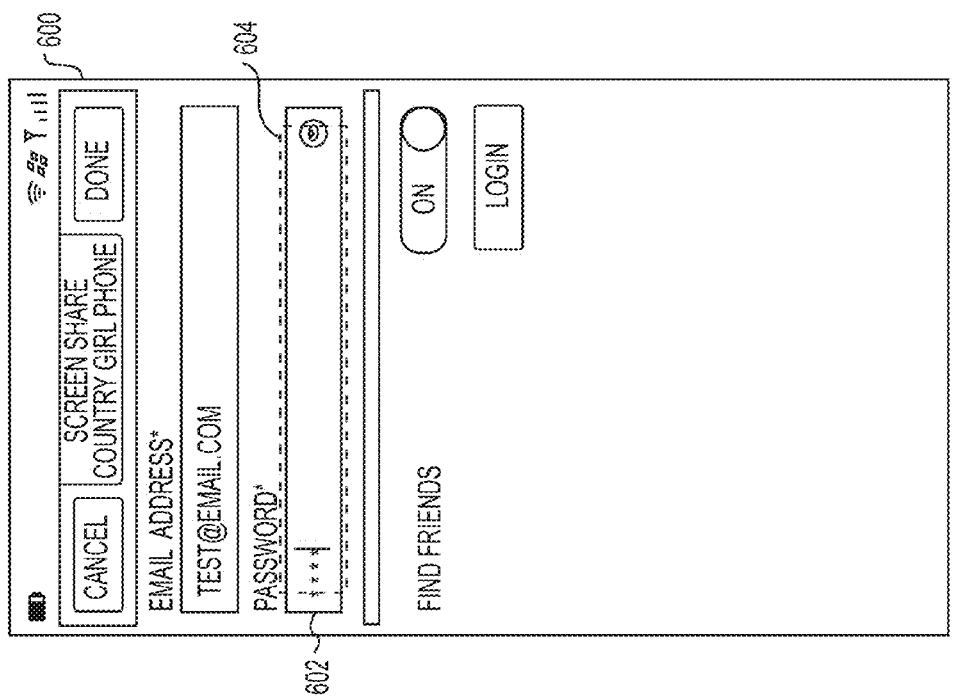
FIG. 6 illustrates an example graphical user interface displayed on a transmitting mobile communication device during a screen sharing mode, in accordance with an example embodiment.

In certain embodiments, obfuscation can be applied to a deactivated user interface component that involves confidential information. FIG. 6 shows an example of a transmitting device user interface 600, in accordance with an example embodiment, which can be displayed as a result of determining that the current input focus is no longer associated with a user interface component involving confidential information. For example, a user of transmitting device user interface 600 enters an email address and password during screen sharing, similar to the descriptions set forth above. After detecting that password textbox 602 is no longer activated, and that password textbox 602 contains inputted confidential information, operating system 232 can request that screen image data transmitted to a receiving device be overlaid with an obfuscation element to protect the confidential information.

For example, after the screen service captures screen image data depicting the screen of the transmitting device, operating system 232 can place an obfuscation element on the screen image data before or after placing the screen image data onto the image buffer. The user of the transmitting device can be informed of the placement of the obfuscation element by the placement of an obfuscation outline 604 on the screen of the transmitting device. Obfuscation outline 604 can inform the user that an obfuscation element will be displayed on the receiving device, while still allowing the user of the transmitting device to see the confidential information.

The obfuscation element can be any type of element that obstructs view of the password, such as a blurring element, a hatched pattern overlay, or a solid color overlay. The obfuscation element can be applied to the screen image data based on the known position of password textbox 602 on the transmitting device user interface 600, and if operating system 232 determines that password textbox 602 is no longer activated and contains inputted data, operating system 232 can request that the obfuscation element be placed on the screen image data at a position corresponding to the position of password textbox 602.

Figure 7:
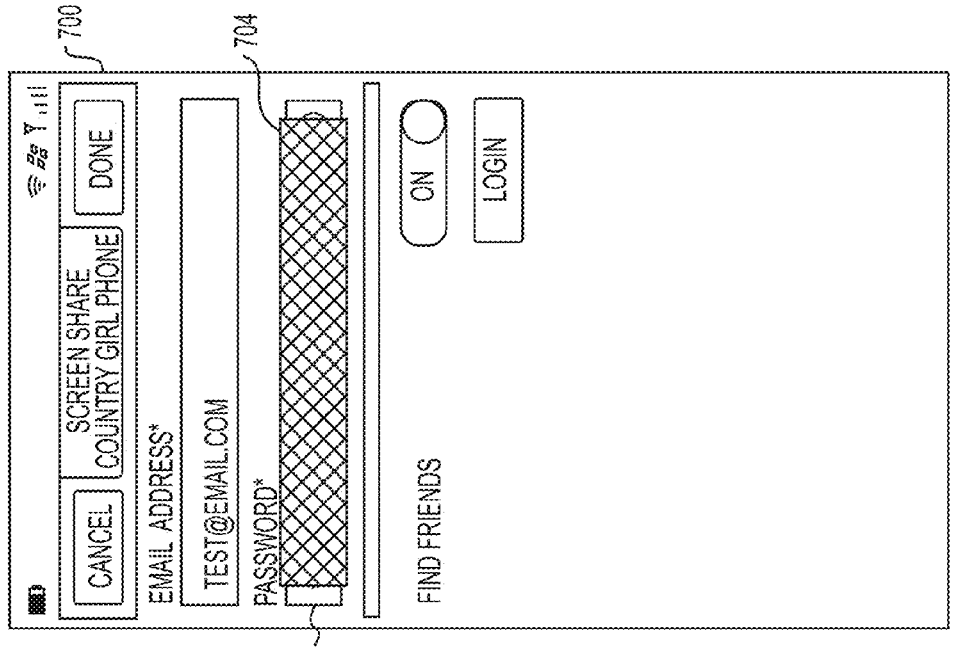
FIG. 7 illustrates an example graphical user interface displayed on a receiving mobile communication device during a screen sharing mode, in accordance with an example embodiment.

FIG. 7 shows an example of a receiving device user interface 700, in accordance with an example embodiment. Receiving device user interface 700 can represent transmitting device user interface 600, including a password textbox 702 reflecting password textbox 602, but an obfuscation element 704 is placed over password textbox 702 to prevent the receiving device from seeing any information regarding password textbox 702 once screen sharing resumes. Obfuscation element 704 can provide added security by preventing the receiving device from being able to determine how many characters a password includes, such as by making it difficult for the receiving device to perceive the number of masked characters in password textbox 702.

Figure 8:
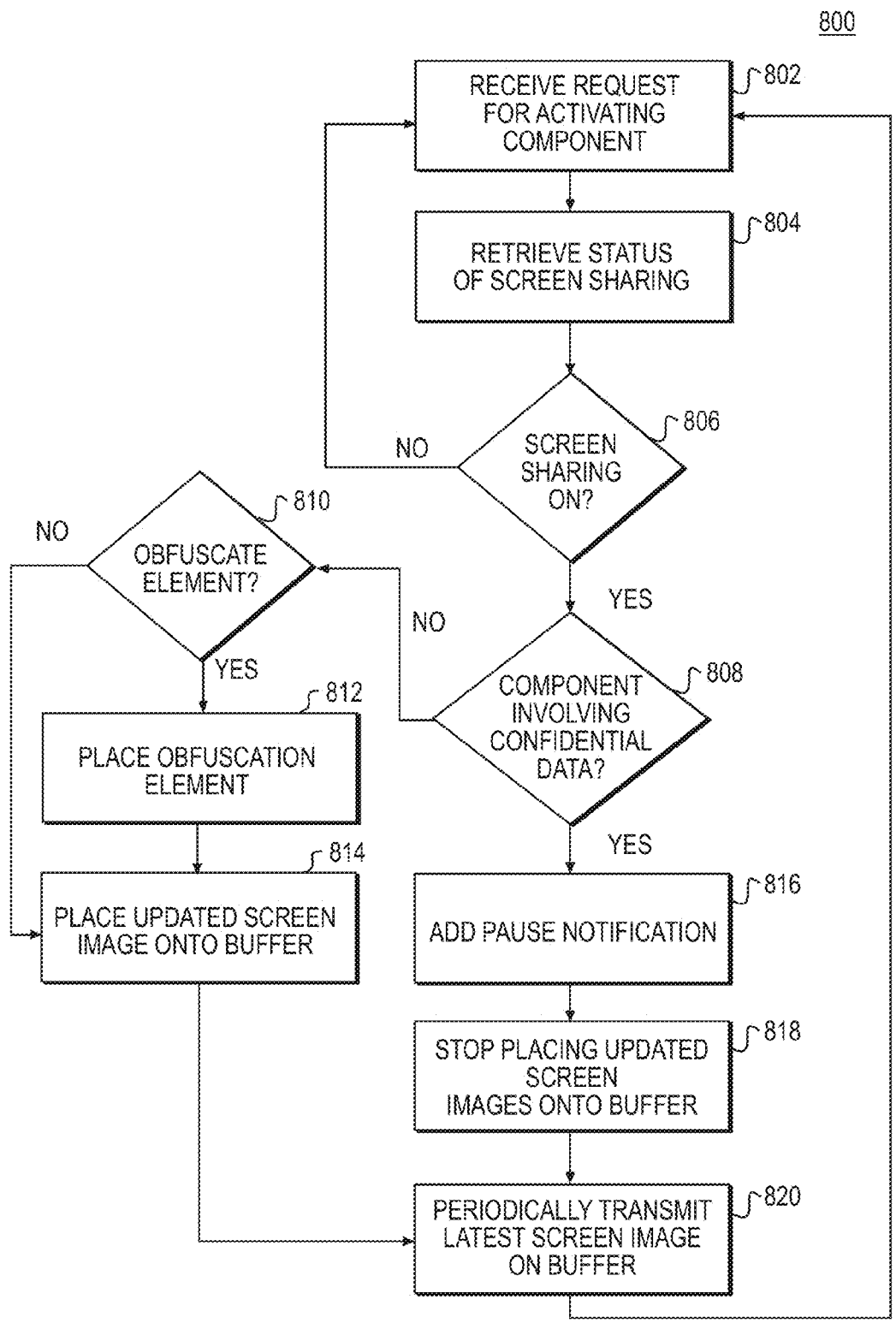
FIG. 8 is a flow diagram of an example method for transmitting shared image data from a transmitting device to a receiving device.

FIG. 8 is a flowchart representing an example method for suspending screen sharing between devices. Using method 800, a user of a mobile device, such as mobile device 102, can protect confidential information from being transmitted to a receiving device, thereby avoiding a potential security risk. It is to be appreciated that method 800 is not limited to being performed on a mobile device, and can be performed by any computing devices that can be connected by way of wired or wireless connection. For example, in certain embodiments, method 800 can be performed by way of operating system 232 executing on processor 202 of mobile device 102. However, method 800 is not limited to being performed on mobile device 102, and any of mobile device 102, mobile device 106, or laptop computer 108 can initiate a video conference in accordance with method 800.

Method 800 begins at step 802, where the operating system receives a request for activating a user interface component. The activation of the user interface component can be, for example, based at least in part on detecting that a current input focus is associated with the user interface component. Alternatively, the activation of the user interface component can be based at least in part on receiving user input associated with the user interface component, or can be based at least in part on receiving a request to display a specific user interface component. For example, a request can be received to display a virtual keyboard that is a keyboard specific for use with password entry, as the keyboard includes additional numbers and letters beyond those displayed on the standard virtual keyboard used by the device.

At step 804, the operating system retrieves information regarding the current status of screen sharing with another device, and at step 806, the operating system determines whether screen sharing is currently enabled. If the operating system determines that screen sharing is not currently enabled, method 800 proceeds back to step 802 to await a request to activate another user interface component. After determining that screen sharing is currently enabled, method 800 proceeds to step 808.

At step 808, the operating system determines whether the activated user interface component involves confidential information. For example, the operating system can determine that the activated user interface component is a password input textbox where the user would enter confidential information, such as a password. In another embodiment, the operating system can determine that the virtual keyboard requested for display in step 802 is a password-specific virtual keyboard, and that any information entered using the password virtual keyboard will or is likely to be confidential information. If it is determined that the activated user interface component is not associated with confidential information, method 800 proceeds to step 810. Alternatively, if the operating system determines that the activated interface component is associated with confidential information, method 800 proceeds to step 816.

At step 810, if the operating system determines that the activated user interface component is not associated with confidential information, the operating system also determines if any user interface components includes elements that should be obfuscated. For example, while the activated user interface component does not involve confidential information (e.g., a standard textbox), a user may have entered confidential information (e.g., indicators showing the length of a password) into a previously activated user interface component (e.g., a password textbox).

At step 812, if the operating system determines that a user interface component contains confidential information and that an obfuscation element should be used, the operating system can place an obfuscation element onto the screen image data depicting the current screen, where the obfuscation element can be placed on the screen image data at a position corresponding to the user interface component that contains confidential information. The operating system may determine whether to place an obfuscation element on the screen image data based on a preference defined in the operating system. Alternatively, if the operating system determines that an obfuscation element should not be used, step 810 proceeds directly to step 814, bypassing placement of the obfuscation element on the screen image data.

At step 814, screen image data is placed in an image buffer for transmission to a receiving device. The screen image data is placed onto a transmission stream used for streaming screen image data, and transmitted such that the receiving device can view updates occurring on the user interface of the transmitting device.

Alternatively, at step 816, if the operating system determines that the activated user interface component is associated with confidential information, the operating system modifies a notification on the displayed user interface to indicate that screen sharing will be paused. The operating system then requests that screen sharing be paused due to the entry or display of confidential information.

At step 818, based on the request from the operating system, a camera service can access a screen service to request that screen sharing be paused. The screen service can then suspend placing updated screen images on an image buffer. After the screen service reports that screen sharing is paused and that no screen image data is being placed onto the image buffer by the screen service, the camera service can retrieve the single screen image that was last placed on the buffer prior to the screen service suspending updating of the screen image data, and can periodically place the single screen image onto the image buffer used for streaming screen image data. This single screen image can contain the updated notification signifying that screen sharing is paused.

Finally, at step 820, the image data placed on the transmission stream is periodically transmitted to the receiving device. If it is determined that the activated user interface component was not associated with confidential information, the screen image data periodically transmitted to the receiving device will be screen image data depicting the current screen of the transmitting device. Alternatively, if it is determined that the activated user interface component is associated with confidential information, the screen image data periodically transmitted to the receiving device will be the single screen image, depicting the screen of the transmitting device immediately prior to pausing of screen sharing. This single screen image can be periodically placed onto the image buffer and transmitted to the receiving device while updating of the screen image data is suspended, so that the receiving device is informed that screen sharing is paused based on confidential information. Method 800 then proceeds back to step 802 to await a request to activate another user interface component.

While the example embodiments set forth above depict one example method of determining whether a user interface component involves confidential information, alternative embodiments can also be considered. For example, it is to be appreciated that operating system 232 can determine that a user interface component involves confidential information based on any sort of condition, and that the determination is not necessary based on a pre-known condition that a particular user interface component involves confidential information. For example, operating system 232 can expose an API allowing a software application to request pausing of screen sharing based on a condition determined by the software application, without requiring the activation of a particular user interface component. This would enable a software application to define when the condition of confidentiality should be enforced, and operating system 232 will then pause screen sharing based on the modified condition set by the application.

In another example embodiment, operating system 232 can monitor the execution of software applications 234, and can compare an application identifier to a pre-determined list of applications that contain confidential information, or can compare permission for the application to an approved list of sharable applications. Therefore, when operating system 232 determines that screen sharing is currently active, and that an application that contains confidential information is preparing to execute on mobile device 102, operating system 232 can suspend the transmission of screen image data until the application is closed and no longer displayed.

For example, mobile device 102 can include software applications relating to confidential topics such as banking, government, or finances, or can include confidential applications such as password vault applications, where passwords for a variety of services can be stored. In certain embodiments, these applications can be configured to have identifying attributes that will be recognized by operation system 232, such as a "non-shareable" permission attribute. Therefore, when such applications begin to execute on mobile device 102, operating system 232 can detect the permission attribute, and suspend sharing when the appropriate permission attribute is present. Upon closing or minimizing of the non-shareable application, screen sharing can then continue. In yet another embodiment, screen sharing can continue while the non-shareable application is executing, but an obfuscation element can be placed over the portion of the display containing the non-shareable application.

In yet another embodiment, the non-sharable permission attribute can be applied to specific user interface forms or dialog boxes associated with a software application. Operating system 232 can detect the permission attribute for the particular form or dialog box, and suspend sharing when the form or dialog box is displayed. Alternatively, operating system 232 can determine that a form or dialog box potentially involves confidential data based on the number of data entry fields associated with the form or dialog box, without checking for a non-sharable permission attribute. For example, a particular form or dialog box can involve a large number of fields for data entry. When operating system 232 receives a request to display the form or dialog box, operating system 232 can determine that the form or dialog box likely involves confidential information based on the number of different fields being displayed on the form or dialog box, and can pause screen sharing for the specific form or dialog box.

In yet another example embodiment, mobile device 102 can be connected to a television or computer monitor, or to a projector, and screen sharing can be initiated directly without the involvement of video conferencing. This can allow demonstrations or presentations to be given to a large group of people by simply using the screen sharing functionality of mobile device 102. Furthermore, mobile device 102 can perform similar steps of determining whether confidential information is depicted on the screen, as set forth above. For example, mobile device 102 can be connected to a monitor or projector by way of data port 218, such as by HDMI, DVI, DisplayPort, USB, or other wired connection; or by way of short-range wireless communications subsystem 226, such as by Bluetooth, Wireless HD, WHDI, WiDi, Miracast, AirPlay, NFC, UWB, or other wireless connection. After the devices are connected, mobile device 102 can enter a presentation mode, whereby the screen of mobile device 102 is replicated on the monitor or projector. Selecting a password textbox while mobile device 102 is in presentation mode (and therefore screen sharing) can result in pausing the image replicated on the monitor or projector, using the pausing process outlined above. Mobile device 102 can also be connected to a plurality of devices in a one-to-many multicast session for the presentation mode, where the screen of mobile device 102 is replicated on the plurality of devices in the multicast session.

It is to be appreciated that the disclosed embodiments can be implemented on the transmitting device without requiring any additional implementation on the receiving device beyond the ability to share screens. As set forth above, the transmitting device can make the determination that screen sharing is occurring, and can determine whether to pause screen sharing based upon determining whether confidential information is depicted on the screen. Based on this determination, an appropriate notification message is placed on the screen image data at the transmitting side, and periodically transmitted to the receiving device. The receiving device needs no additional features to receive the transmitted screen image data, and the receiving device is only aware that screen image data is being periodically received from the transmitting device. Thus, the functionality of providing a notification to a user of a receiving device that screen sharing has been paused can be provided without requiring any additional steps by the user of the receiving device.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system or existing communications software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps and/or inserting or deleting steps. It is intended, therefore, that the specification and examples be considered as example only, with a true scope and spirit being indicated by the following claims and their full scope of equivalents.

What is claimed is:

1. A method for sharing image data between a source device and at least one receiving device, the method comprising:
   periodically sending image data of a shared screen to the at least one receiving device using a sharing connection;
   receiving a request associated with activating a user interface component;
   determining that the user interface component is configured to display confidential information;
   in response to the determining that the user interface component is configured to display confidential information:
     suspending updating of the image data responsive to the received request; and
     periodically placing a single screen image in an image buffer, wherein the single screen image is generated periodically and the single screen image represents a last screen of the source device captured prior to suspending; and
   periodically sending suspended image data to the at least one receiving device while updating is suspended, wherein the suspended image data includes the single screen image that represents the last screen of the source device captured prior to suspending.

2. The method of claim 1, wherein activating the user interface component is based at least in part on receiving user input associated with the user interface component.

3. The method of claim 1, wherein activating the user interface component is based at least in part on receiving a request to display a virtual keyboard having keyboard elements specific to entry of confidential information.

4. The method of claim 1, wherein activating the user interface component is based at least in part on determining that a current input focus is associated with the user interface component.

5. The method of claim 4, wherein the user interface component is no longer activated when the current input focus is not associated with the user interface component.

6. The method of claim 1, further comprising resuming updating of the image data responsive to determining that the user interface component is no longer activated.

7. The method of claim 6, further comprising:
   determining whether confidential information is displayed in the user interface component after determining that the user interface component is no longer activated;
   obfuscating the confidential information; and
   sending an obfuscation element with the suspended image data to the at least one receiving device while updating is suspended.

8. The method of claim 1, wherein suspending updating of the image data comprises preventing updated image data from being placed into the image buffer.

9. The method of claim 1, further comprising displaying a notification indicating that screen sharing is suspended.

10. The method of claim 9, wherein the notification is added before updating of the image data is suspended, and wherein the suspended image data sent to the at least one receiving device includes the notification.

11. The method of claim 1, wherein activating the user interface component comprises determining that the user interface component includes information designated not to be shared.

12. The method of claim 1, wherein the user interface component is associated with the confidential information, and wherein the confidential information is one of a login credential, an account number, a social security number, a credit card number, or information related to finances.

13. The method of claim 1, wherein the user interface component is associated with authentication.

14. The method of claim 13, wherein the user interface component is one of an authentication field and an authentication prompt.

15. A source device for sharing image data with at least one receiving device, the source device comprising:
   one or more computer-readable storage media enabled to store instructions; and
   one or more processors enabled to execute the instructions, the executing of the instructions causing the source device to:
     periodically send image data of a shared screen to the at least one receiving device using a sharing connection;

receive a request associated with activating a user interface component;

determining that the user interface component is configured to display confidential information;

in response to the determining that the user interface component is configured to display confidential information:

suspend updating of the image data responsive to the received request; and periodically place a single screen image in an image buffer, wherein the single screen image is generated periodically and the single screen image represents a last screen of the source device captured prior to suspending; and periodically send suspended image data to the at least one receiving device while updating is suspended, wherein the suspended image data includes the single screen image that represents the last screen of the source device captured prior to suspending.

16. The source device of claim 15, wherein activating the user interface component is based at least in part on one of the following or any combination thereof:

receiving user input associated with the user interface component, receiving a request to display a virtual keyboard having keyboard elements specific to entry of confidential information, or determining that a current input focus is associated with the user interface component.

17. The source device of claim 15, wherein the instructions further cause the source device to resume updating of the image data responsive to determining that the user interface component is no longer activated.

18. The source device of claim 15, wherein suspending updating of the image data comprises preventing updated image data from being placed into the image buffer.

19. One or more tangibly-embodied nontransitory computer-readable storage media storing instructions that, when executed by one or more processors of a source device, cause the source device to:

periodically send image data of a shared screen to at least one receiving device using a sharing connection;

receive a request associated with activating a user interface component;

determining that the user interface component is configured to display confidential information;

in response to the determining that the user interface component is configured to display confidential information:

suspend updating of the image data responsive to the received request; and periodically placing a single screen image in an image buffer, wherein the single screen image is generated periodically and the single screen image represents a last screen of the source device captured prior to suspending; and periodically send suspended image data to the at least one receiving device while updating is suspended, wherein the suspended image data includes the single screen image that represents the last screen of the source device captured prior to suspending.

20. The one or more tangibly-embodied nontransitory computer-readable storage media of claim 19, wherein activating the user interface component is based at least in part on one of the following or any combination thereof:

receiving user input associated with the user interface component, receiving a request to display a virtual keyboard having keyboard elements specific to entry of confidential information, or determining that a current input focus is associated with the user interface component.

21. The one or more tangibly-embodied nontransitory computer-readable storage media of claim 19, wherein the instructions further cause the source device to resume updating of the image data responsive to determining that the user interface component is no longer activated.

22. The one or more tangibly-embodied nontransitory computer-readable storage media of claim 19, wherein suspending updating of the image data comprises preventing updated image data from being placed into the image buffer.

* * * * *